Oct. 11, 1932.
R. J. KUNATH
HARNESS MOTION FOR LOOMS
Re. 18,616
2 Sheets-Sheet 1
Original Filed April 25, 1927
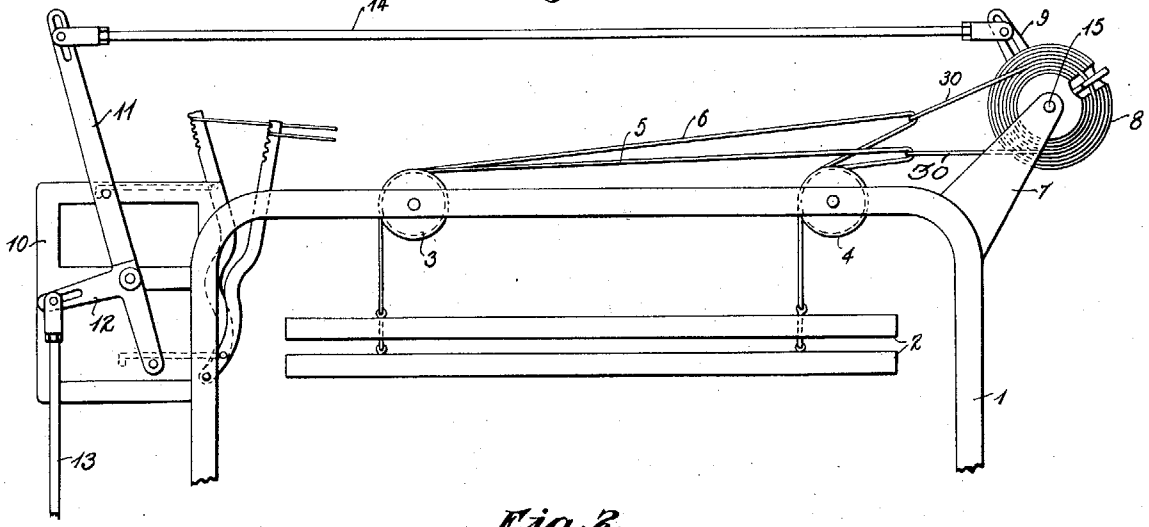
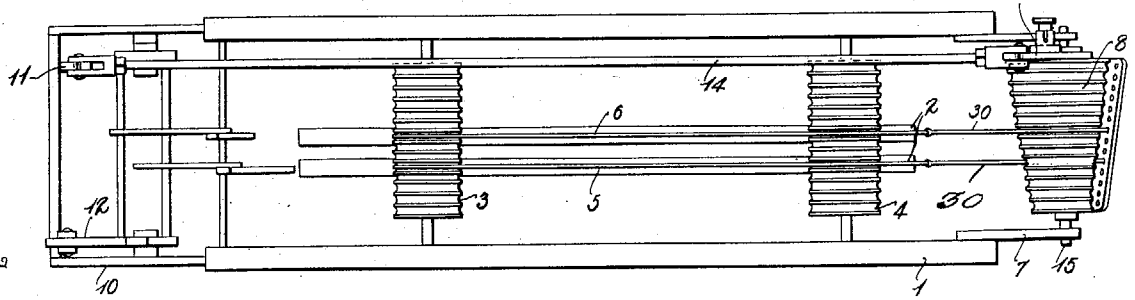
Inventor
Richard J. Kunath
By Bacon & Thomas
Attorneys

R. J. KUNATH

Oct. 11, 1932. HARNESS MOTION FOR LOOMS Re. 18,616

2 Sheets-Sheet 2

Original Filed April 25, 1927

Inventor
Richard J. Kunath

By Bacon & Thomas
Attorneys

Reissued Oct. 11, 1932 Re. 18,616

UNITED STATES PATENT OFFICE

RICHARD J. KUNATH, OF RIDGEFIELD PARK, NEW JERSEY

HARNESS MOTION FOR LOOMS

Original No. 1,714,791, dated May 28, 1929, Serial No. 186,537, filed April 25, 1927. Application for reissue filed May 27, 1931. Serial No. 540,482.

This invention relates to harness motions for looms and has for its object to provide a novel motion for use in connection with various types of looms which permit of the leveling operation being performed with greater facility than with conventional harness motions.

Other objects of the invention relate to details of construction tending to increase the ease and accuracy of operation and also tending toward cheapness of production.

Fig. 1 is a rear elevation of a loom embodying my improved harness motion.

Fig. 2 is a top plan view of the structure shown in Fig. 1, and

Figure 3:
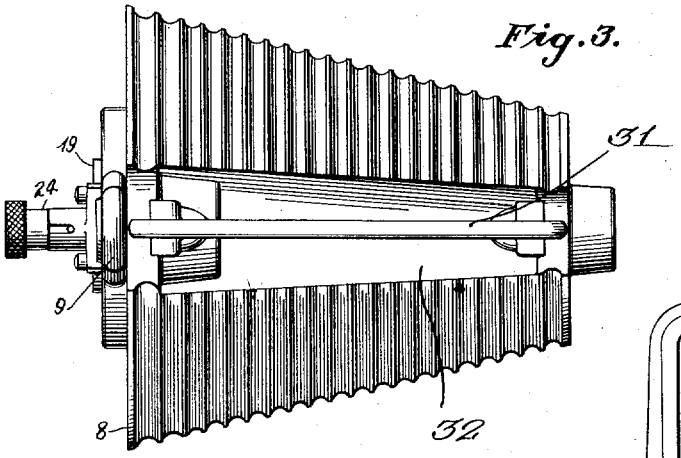
Figure 5:
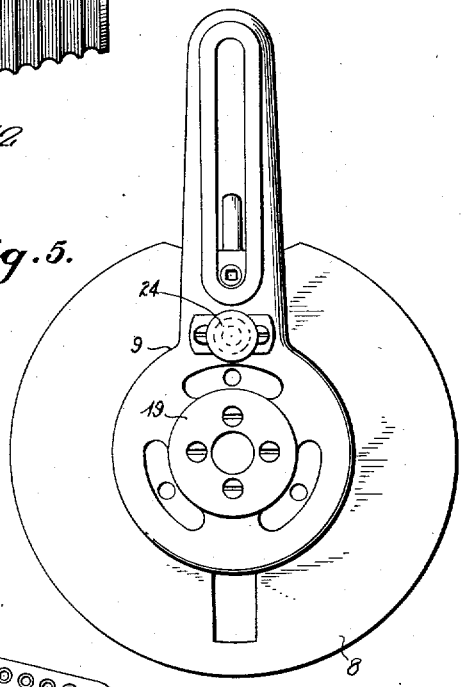
Figure 4:
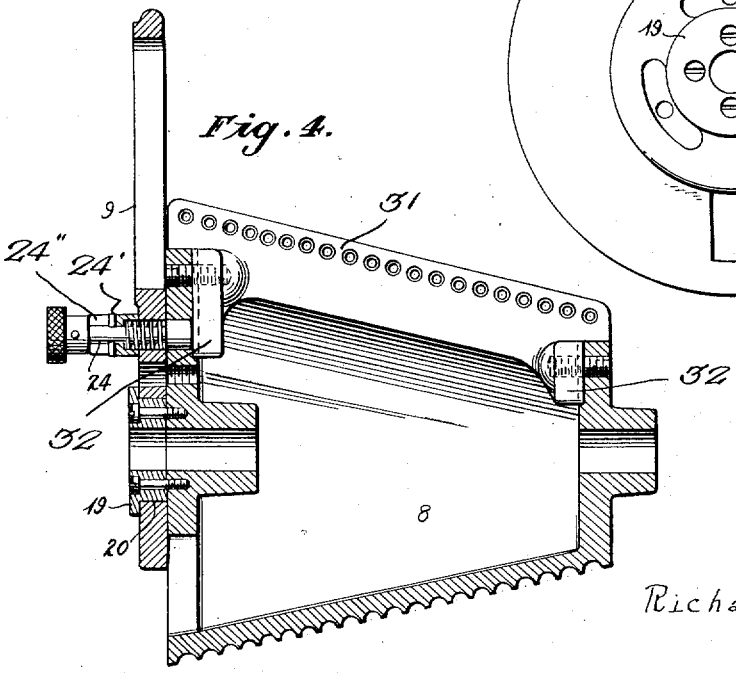

Figs. 3, 4, and 5 are detail views illustrating the structure of the cone and its releasable actuating arm.

Referring now to the drawings, it will be seen that the reference character 1 designates the framework of the conventional loom construction. It will be understood, of course, that only so much of the loom is shown as is necessary to fairly illustrate the improvements which I have applied thereto. In the loom herein illustrated, there are two harness frames indicated by the reference character 2. These frames are reciprocated by means of flexible cables 5 and 6, each of which is secured at its ends to one of the loom frames and passes over the two idler pulleys or rolls 3 and 4.

For the purpose of actuating the harness frames, there is provided a cone 8 journaled on the shaft 15, which shaft is mounted in the up-standing brackets 7. Secured to the cone 8 is a plurality of flexible elements 30, the ends of which are operatively connected with the flexible cables 5 and 6 intermediate the ends of the latter. By means of this construction, the oscillation of the cone 8 imparts through the flexible members 5, 6 and 30, a reciprocating motion to the harness frames 2.

The loom frame is provided at one end with the usual dobby construction whereon is pivotally mounted an oscillating lever 11. An arm 12, which is formed integrally with the lever 11, is connected with the drive rod 13 which is in turn connected at its opposite end to any suitable portion of the loom driving mechanism. The upper end of the lever 11 is connected by means of the link 14 with an arm 9 for actuating the cone.

Referring now to Figs. 3, 4, and 5, which illustrate details of construction of the cone, it will be seen that the arm 9 is journaled on the reduced portion 20 of a disk 19 which is bolted to the face of cone 8 at the enlarged end thereof. As indicated above, the cone 8 is freely rotatable on the shaft 15 and is rotatable independently of the arm 9. A spring pressed plunger 24 is provided in the arm 9 and is adapted to be received in suitably formed recesses in the end face of the cone for clutching the cone to the arm to effect the operation thereof. The stem of plunger 24 carries a transverse pin 24′ which engages and moves in a longitudinal slot 24″ formed in the boss surrounding the stem of the plunger. By pulling the plunger outwardly and slightly rotating it the pin can be placed in engagement with the end face of the boss whereby it will hold the plunger in retracted position. By means of this construction, the drive to the cone can be disconnected at will for permitting the manual leveling operation to be performed. The circumference of the cone is broken by a longitudinally disposed opening 32, the purpose of which is to receive a securing bar 31 for the flexible elements 30. This bar is provided with shoulders which seat in notches formed in the end walls of the cone and may be secured to these walls in any suitable manner. As herein shown the bar 31 has a flange 32 at each end thereof, which flanges engage and are bolted to the inner faces of the cone end walls. The securing bar is further provided with a plurality of apertures in alignment with the grooves on the periphery of the cone for receiving and securing to the cone a plurality of the flexible members 30. Attention is directed to the fact that in addition to the shaft bearings which are cast integrally with the cone, the steel disk serves as an additional bearing and thereby retards the wear on the bearings of the cone proper.

The operation of the device should be apparent from the foregoing description, and for this reason a detailed account of the action of the various parts is believed to be unnecessary. The operation differs from the conventional harness motions primarily in that instead of connecting the harness frames directly to the idler rolls and applying an oscillatory motion to the latter, in my device the reciprocating movement is imparted to the harness frames by means of the additional cone element which is connected through the flexible elements 30 to the cables which are connected to the frames and which pass over the idler rolls 3 and 4. I prefer to employ my invention in the manner shown in Fig. 1 without disturbing the usual dobby structure other than to disconnect it from the drive. However, it should be understood that the dobby can be entirely dispensed with, in which case my cone motion device can be positioned at the opposite end of the machine and have direct connection with the drive rod. In this case, the connections from the cone to the harness frames would be substantially as shown except that they would be reversed as to direction.

In either mode of use, the cone possesses the important advantage of supplying a means in the actuating train whereby the actuation can be suspended at will in order to permit of the leveling operation.

While I have herein indicated the two preferred methods of use of my novel cone motion, I desire that it be understood that this motion may be otherwise applied to existing loom frames without departing from the spirit of my invention. I also desire that it be understood that my invention is not necessarily limited to the specific details of construction shown and described otherwise than as indicated in the claims.

What I claim as my invention is:

1. In a harness motion for looms, the combination with a loom frame, of a plurality of harness frames, a plurality of idler rolls journaled on said loom frame, a plurality of flexible cables each having its ends secured to one of said harness frames and passing over said rolls, and a cone having flexible connections with said harness frame for actuating the latter, said cone comprising a circumferentially grooved conical element, a perforated securing bar mounted in a longitudinal opening in the circumference of said cone, a disk secured to an end wall of said cone, a lever journaled on said disk, and a spring-pressed locking pin carried by said lever for engagement with said cone for clutching the latter to said lever and thereby effecting the oscillation thereof.

2. In a loom, the combination with a plurality of harness frames and actuating cables therefore, of means for actuating said cables comprising an oscillatable cone, a perforated securing bar mounted on said cone, a plurality of flexible elements each having one end secured to said bar and the opposite end engaged with one of said cables and means for oscillating said cone.

3. In a loom, the combination with a plurality of harness frames and actuating cables therefor, of means for actuating said cables comprising an oscillatable cone, means connecting said cone with each of said cables, an oscillatable lever mounted adjacent an end wall of said cone and coaxial therewith, a slidable clutch pin carried by said lever and adapted for engagement with apertures in said end wall, a spring for moving said pin into clutching position and means for holding said pin retracted against the tension of said spring.

4. In a loom, the combination with a plurality of harness frames and actuating cables therefor, of means for actuating said cables comprising an oscillatable cone, a flanged bearing member secured to an end of said cone, an oscillatable arm journaled on said bearing member between said flange and the end wall of the cone, and a clutch member carried by said oscillatable member and adapted to engage said cone for imparting movement thereto.

5. In a harness motion for looms, the combination with a loom frame, of a plurality of harness frames, a plurality of idler rolls journaled on said loom frame above the harness frames, bracket members connected to one upper corner portion of the loom frame and projecting vertically and longitudinally of the latter, a single cone having a plurality of integral steps journaled on the outer end portions of said brackets, a plurality of flexible elements each detachably connected to said cone at one end, said elements extending only partly around the cone and in opposite directions with their free end portions extending substantially longitudinally of the loom frame, a plurality of flexible elements each connected at its ends to one of said harness frames and passing over said idler rolls, connections between the said free end portions of the first mentioned flexible elements and the intermediate portions of the second mentioned flexible elements, and means directly connected to the cone for oscillating the same, said means including an oscillatable arm, a longitudinally movable link connected to said arm, means for moving the link, and a connection between the said arm and the cone.

6. In a harness motion for looms, the combination with a loom frame, of a plurality of harness frames, a plurality of idler rolls journaled on said loom frame above the harness frames, bracket members connected to one upper corner portion of the loom frame and projecting vertically and longitudinally of the latter, a cone journaled on the outer end portions of said brackets, a plurality of flexible elements each detachably connected to said cone at one end, said elements extending only partly around the cone and in opposite directions with their free end portions extending substantially longitudinally of the loom frame, a plurality of flexible elements each connected at its ends to one of said harness frames and passing over said idler rolls, connections between the said free end portions of the first mentioned flexible elements and the intermediate portions of the second mentioned flexible elements, and means for oscillating said cone, said means including an oscillatable arm, a longitudinally movable link connected to said arm, means for moving the link, and a spring pressed clutching element for connecting and disconnecting the arm with respect to the cone.

7. In a harness motion for looms, the combination with a loom frame, of a plurality of harness frames, a cone, means for mounting the cone on the loom frame with the said cone located above and beyond one end of the said frame, flexible means connected to the cone to extend only partly around the latter in opposite directions and to be operated thereby, means for connecting the flexible means to said harness frame, an oscillatable arm, a link pivotally connected to said arm, means for connecting and disconnecting the arm with respect to the cone to cause the cone to partake of the movements of the arm when connected, and means for reciprocating the link.

RICHARD J. KUNATH.